(12) United States Patent
Zhang et al.

(10) Patent No.: US 8,565,170 B2
(45) Date of Patent: Oct. 22, 2013

(54) METHOD AND APPARATUS FOR SCHEDULING DATA TRANSMISSION ON MULTIPLE CARRIERS

(75) Inventors: Danlu Zhang, San Diego, CA (US); Pavan Kumar Vitthaladevuni, San Diego, CA (US); Ravi Agarwal, San Diego, CA (US); Jilei Hou, San Diego, CA (US); Bibhu P. Mohanty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 915 days.

(21) Appl. No.: 12/687,006

(22) Filed: Jan. 13, 2010

(65) Prior Publication Data

US 2011/0019625 A1 Jan. 27, 2011

Related U.S. Application Data

(60) Provisional application No. 61/144,639, filed on Jan. 14, 2009, provisional application No. 61/144,593, filed on Jan. 14, 2009, provisional application No. 61/160,973, filed on Mar. 17, 2009.

(51) Int. Cl.
*H04W 4/00* (2009.01)

(52) U.S. Cl.
USPC .................. 370/329; 455/127.5; 455/522

(58) Field of Classification Search
USPC .............. 370/328–329, 336–337, 347, 465; 455/127.1, 127.5, 522

See application file for complete search history.

(56) References Cited

U.S. PATENT DOCUMENTS

| 6,449,484 B1 * | 9/2002 | Grubeck et al. ............... 455/450 |
| 6,819,934 B1 * | 11/2004 | Truong et al. ................. 455/522 |
| 7,142,864 B2 * | 11/2006 | Laroia et al. .................. 455/450 |
| 7,411,930 B2 | 8/2008 | Montojo et al. |

(Continued)

FOREIGN PATENT DOCUMENTS

| JP | 2001517049 A | 10/2001 |
| TW | 200539594 | 12/2005 |

(Continued)

OTHER PUBLICATIONS

International Search Report and Written Opinion—PCT/US2010/021063, International Search Authority—European Patent Office—Aug. 31, 2010.

(Continued)

*Primary Examiner* — Kevin Mew
(74) *Attorney, Agent, or Firm* — Darren M. Simon

(57) ABSTRACT

Techniques for scheduling data transmission on multiple carriers in a wireless communication system are described. In one design, a scheduler may receive requested power headrooms for multiple carriers from a user equipment (UE), one requested power headroom for each carrier. Each requested power headroom may be indicative of transmit power usable by the UE for transmission on an associated carrier. The scheduler may also receive queue information indicative of data to transmit by the UE. The scheduler may redistribute the requested power headrooms across the multiple carriers (e.g., based on water filling or greedy filling) to obtain redistributed power headrooms for the multiple carriers. The scheduler may schedule the UE for data transmission on the uplink based on the redistributed power headrooms and the queue information. The scheduler may obtain and send at least one granted power headroom for at least one carrier to the UE.

43 Claims, 4 Drawing Sheets

(56) References Cited

U.S. PATENT DOCUMENTS

| | | | |
|---|---|---|---|
| 7,852,746 B2* | 12/2010 | Jalali | 370/208 |
| 8,077,654 B2* | 12/2011 | Sutivong et al. | 370/328 |
| 8,144,658 B2* | 3/2012 | Damnjanovic et al. | 370/330 |
| 2004/0162083 A1 | 8/2004 | Chen et al. | |
| 2004/0214579 A1* | 10/2004 | Mattila | 455/449 |
| 2005/0094598 A1* | 5/2005 | Medvedev et al. | 370/329 |
| 2006/0203724 A1* | 9/2006 | Ghosh et al. | 370/229 |
| 2006/0221883 A1 | 10/2006 | Damnjanovic et al. | |
| 2007/0070908 A1 | 3/2007 | Ghosh et al. | |
| 2008/0037413 A1 | 2/2008 | Gu et al. | |
| 2009/0046642 A1* | 2/2009 | Damnjanovic | 370/329 |
| 2009/0207746 A1* | 8/2009 | Yuan et al. | 370/252 |
| 2009/0213805 A1* | 8/2009 | Zhang et al. | 370/329 |
| 2010/0273503 A1* | 10/2010 | Tiedemann et al. | 455/453 |
| 2011/0165887 A1* | 7/2011 | Shapira | 455/450 |

FOREIGN PATENT DOCUMENTS

| | | |
|---|---|---|
| TW | 200644524 | 12/2006 |
| TW | 200723807 | 6/2007 |
| WO | 9914975 | 3/1999 |
| WO | WO2009108903 | 9/2009 |
| WO | WO2010051513 | 5/2010 |

OTHER PUBLICATIONS

Junsung Lim, et al., "Channel-Dependent Scheduling of Uplink Single Carrier FDMA Systems" 2006 IEEE 64th Vehicular Technology Conference : VTC 2006-Fall ; Sep. 25-28, 2006, Montreal, Quebec, Canada, Piscataway, NJ : IEEE Operations Center LNKD-DOI:10.

Kim K, et al., "Joint Subcarrier and Power Allocation in Uplink OFDMA Systems" IEEE Communications Letters, IEEE Service Center, Piscataway, NJ, US LNKDDOI: 10.1109/LCOMM.2005. 1437359, vol. 9, No. 6, Jun. 1, 2005, pp. 526-528, XP001230476 ISSN.

Qualcomm Europe: "DC-HSUPA impact on RAN2 specifications," 3GPP Draft; R2-092156 DC-HSUPA Impact on RAN2 Specifications, 3rd Generation Partnership Project (3GPP), Mobile Competence Centre; 650, Route Des Lucioles; F-06921 Sophia-Antipolis Cedex; France, no. Seoul, Korea; Mar. 17, 2009, XP050339993.

Qualcomm Europe: "System Benefits of Dual Carrier HSDPA" 3GPP Draft; RI-081361, 3rd Generation Partnership Project (3GPP), Mobile Competence Centre ; 650, Route Des Lucioles ; F-06921 Sophia-Antipolis Cedex ; France, vol. RAN WG1, no. Shenzhen, China; 200.

Zhang D, et al., "HSUPA Scheduling Algorithms Utilizing RoT Measurements and Interference Cancellations" Communications, 2008. ICC "08. IEEE International Conference on, IEEE, Piscataway, NJ, USA, May 19, 2008, pp. 5033-5037, XP031266265 ISBN: 978-1-4244-2075-9 abstract p. 5034, right-hand column, paragraph 2nd but last.

Taiwan Search Report—TW099101008—TIPO—Apr. 11, 2013.

* cited by examiner

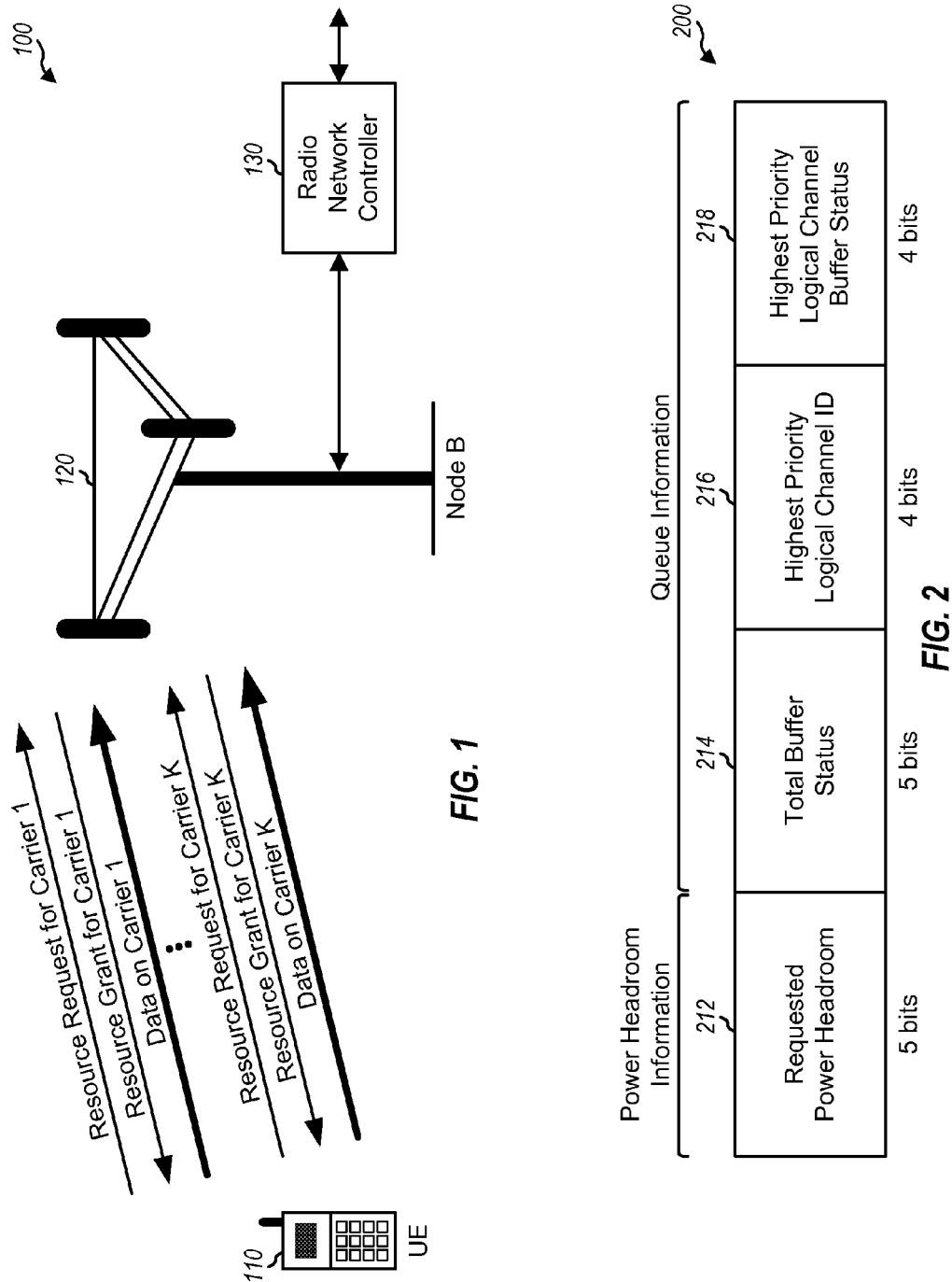

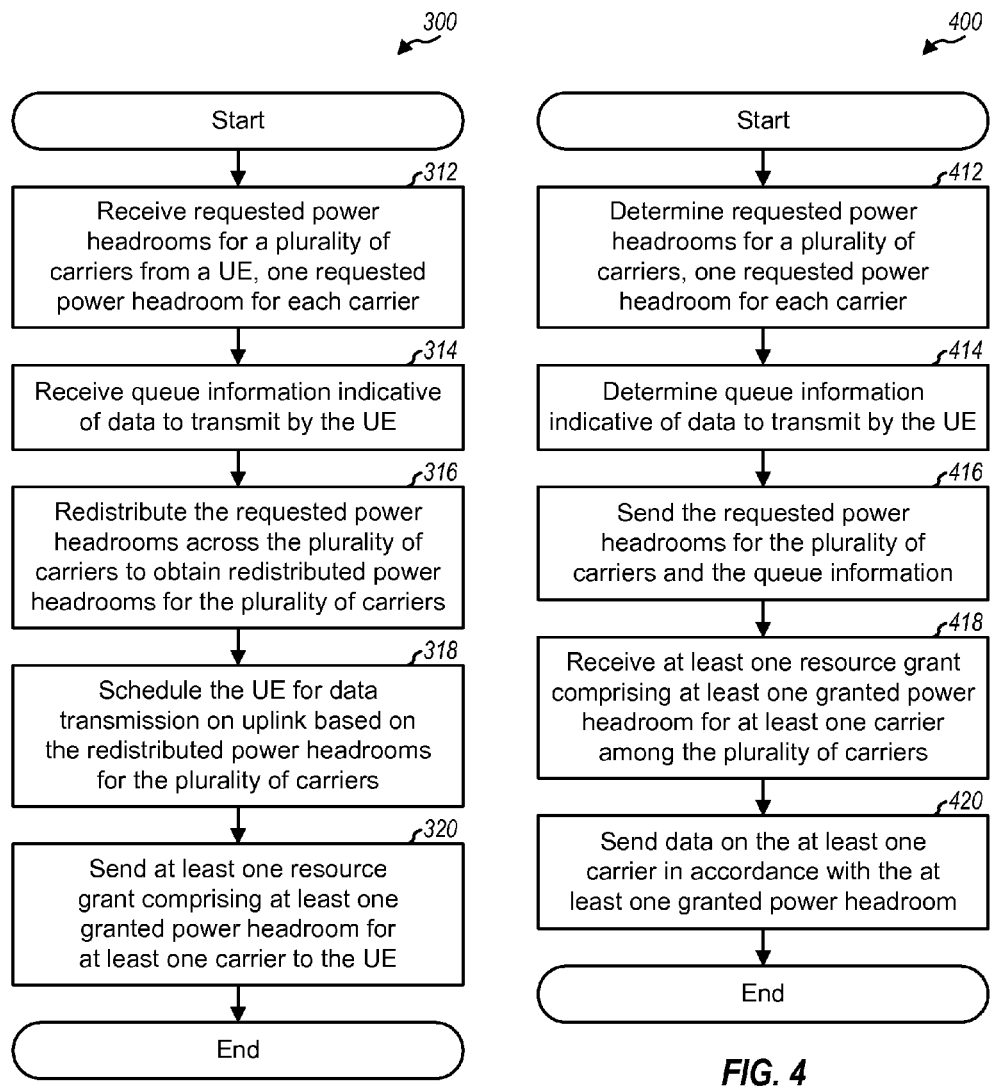

METHOD AND APPARATUS FOR SCHEDULING DATA TRANSMISSION ON MULTIPLE CARRIERS

The present application claims priority to provisional U.S. Application Ser. No. 61/144,639, entitled "METHOD AND APPARATUS FOR SCHEDULING REQUEST SIGNALING IN WIRELESS COMMUNICATIONS," filed Jan. 14, 2009, provisional U.S. Application Ser. No. 61/144,593, entitled "METHOD AND APPARATUS FOR SCHEDULING IN WIRELESS COMMUNICATIONS," filed Jan. 14, 2009, and provisional U.S. Application Ser. No. 61/160,973, entitled "UPLINK SCHEDULING IN MULTIPLE CARRIERS," filed Mar. 17, 2009, all assigned to the assignee hereof and incorporated herein by reference.

BACKGROUND

I. Field

The present disclosure relates generally to communication, and more specifically to techniques for scheduling data transmission in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may support operation on multiple carriers in order to increase system capacity. Each carrier may have a specific center frequency and a specific bandwidth and may be used to send data, control information, pilot, etc. Different carriers may observe different channel conditions and may have different transmission capacities. It may be desirable to support data transmission on the multiple carriers such that good performance can be achieved.

SUMMARY

Techniques for scheduling data transmission on multiple carriers in a wireless communication system are described herein. In one design, a scheduler may receive requested power headrooms for multiple carriers from a user equipment (UE), one requested power headroom for each carrier. Each requested power headroom may be indicative of transmit power usable by the UE for transmission on an associated carrier. The UE may obtain the requested power headrooms for the multiple carriers by distributing a maximum transmit power for the UE evenly across the multiple carriers. The scheduler may also receive queue information indicative of data to transmit by the UE.

The scheduler may redistribute the requested power headrooms across the multiple carriers to obtain redistributed power headrooms for the multiple carriers. The scheduler may redistribute the requested power headrooms based on water filling, greedy filling, or some other scheme. The scheduler may schedule the UE for data transmission on the uplink based on the redistributed power headrooms (instead of the requested power headrooms) for the multiple carriers. The scheduler may also schedule the UE based on the queue information, which may be used to determine the priority of the UE. The scheduler may obtain at least one granted power headroom for at least one carrier. The scheduler may send at least one resource grant comprising the at least one granted power headroom to the UE. The UE may send data on the at least one carrier in accordance with the at least one granted power headroom.

Various aspects and features of the disclosure are described in further detail below.

BRIEF DESCRIPTION OF THE DRAWINGS

FIG. 1 shows a wireless communication system.

FIG. 2 shows a resource request for one carrier.

FIG. 3 shows a process for scheduling data transmission on multiple carriers.

FIG. 4 shows a process for transmitting data on multiple carriers.

DETAILED DESCRIPTION

Figure 5:
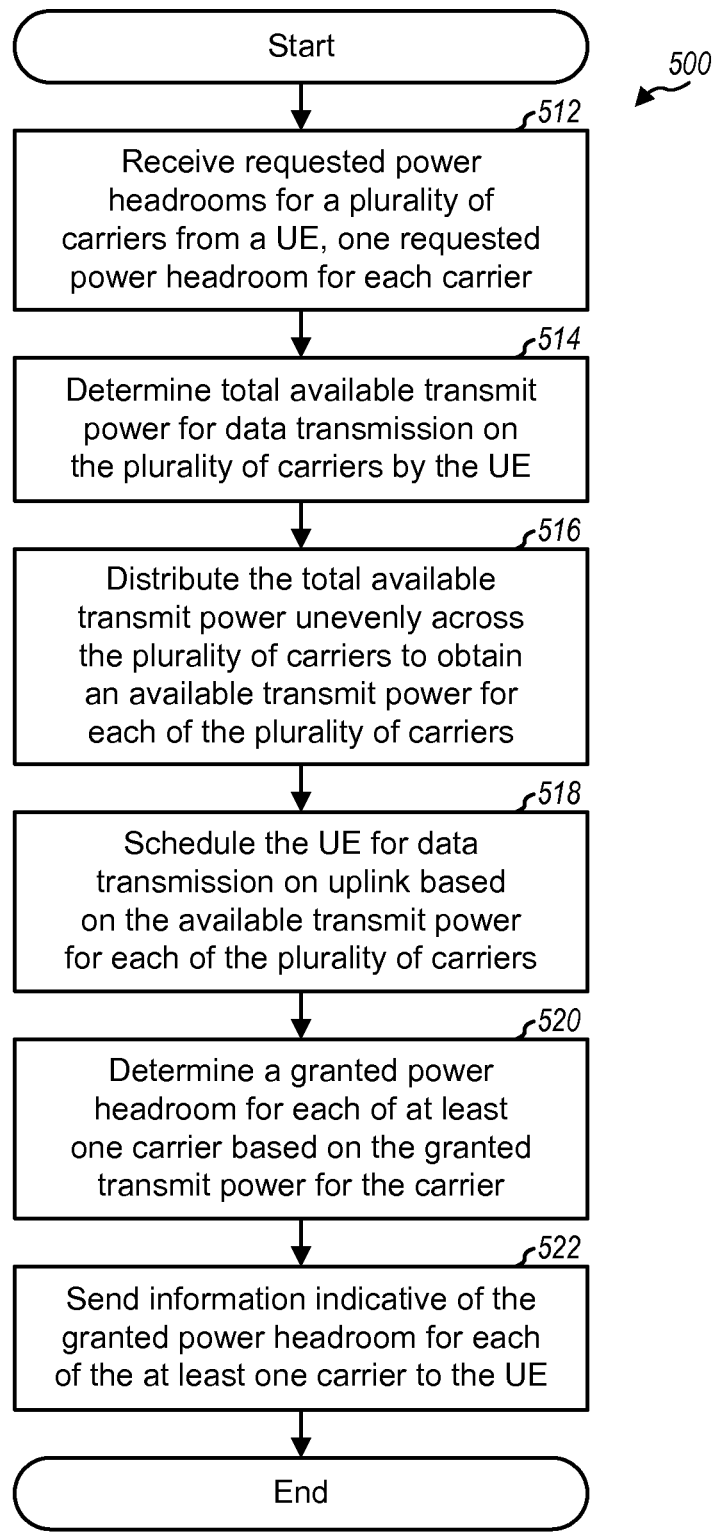
FIG. 5 shows another process for scheduling data transmission on multiple carriers.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for WCDMA, and WCDMA terminology is used in much of the description below.

FIG. 1 shows a wireless communication system 100, which may include a number of Node Bs and other network entities. For simplicity, only one Node B 120 and one Radio Network Controller (RNC) 130 are shown in FIG. 1. A Node B may be a station that communicates with the UEs and may also be referred to as an evolved Node B (eNB), a base station, an access point, etc. A Node B may provide communication coverage for a particular geographic area. To improve system capacity, the overall coverage area of a Node B may be partitioned into multiple (e.g., three) smaller areas. Each smaller area may be served by a respective Node B subsystem. In 3GPP, the term "cell" can refer to the smallest coverage area of a Node B and/or a Node B subsystem serving this coverage area. RNC 130 may couple to a set of Node Bs and may provide coordination and control for these Node Bs.

A UE 110 may be one of many UEs dispersed throughout the system. UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc. UE 110 may communicate with Node B 120 via the downlink and uplink. The downlink (or forward link) refers to the communication link from Node B 120 to UE 110, and the uplink (or reverse link) refers to the communication link from UE 110 to Node B 120.

The system may support data transmission on multiple (K) carriers on the uplink. One or more UEs may be scheduled for uplink data transmission on each carrier at any given moment. A given UE may be scheduled for uplink data transmission on up to K carriers at any given moment, depending on various factors such as the available system resources, the amount of data to send by the UE, the priority of the UE, quality-of-service (QoS) requirements of the UE, etc.

FIG. 1 shows exemplary data transmission on multiple carriers on the uplink. UE 110 may have data to send and may send a resource request for each of the K carriers. A resource request may also be referred to as an uplink request, a scheduling request, a scheduling information (SI) message, etc. The resource request for each carrier may convey a requested power headroom, queue information, and/or other information that may be used to schedule the UE for data transmission on the carrier. The requested power headroom for a carrier may indicate the amount of transmit power that UE 110 can use for the carrier. The queue information may indicate the amount of data to send by UE 110 and may also be referred to as buffer information.

Node B 120 may receive the resource requests for all K carriers from UE 110 and may grant or deny the resource request for each carrier. Node B 120 may send a resource grant for each carrier for which the resource request is granted. A resource grant may also be referred to as a resource assignment, an absolute grant, an uplink grant, etc. The resource grant for each carrier may convey a granted power headroom, a selected transport format, etc. A transport format may be associated with a coding scheme and/or code rate, a modulation scheme, a transport block size, etc. A transport format may also be referred to as a rate, a data rate, a packet format, a modulation and coding scheme (MCS), etc. UE 110 may send data on each carrier in accordance with the resource grant for that carrier.

A joint scheduler or a distributed scheduler may be used for the uplink. A joint scheduler may receive resource requests for all K carriers from all UEs, perform scheduling for all K carriers jointly based on all received resource requests, and grant resources for each carrier such that good overall performance can be achieved. The granted resources may be given by granted power headrooms, data rates, etc. A distributed scheduler may receive resource requests for each carrier from all UEs, perform scheduling for each carrier independently, and grant resources for each carrier based on the resource requests received for that carrier.

UE 110 may send a separate resource request for each carrier to a distributed scheduler. This would allow the distributed scheduler to schedule UE 110 for uplink data transmission on each carrier. UE 110 may also send a separate resource request for each carrier to a joint scheduler. In this case, the joint scheduler may combine the resource requests for all carriers and may grant or deny each resource request. The joint scheduler may grant data rates that may be different from the data rates requested by UE 110. For example, the granted data rates may be higher than the requested data rates for some carriers and may be lower than the requested data rates for some other carriers. However, the total granted data rate may be less than or equal to the total requested data rate. UE 110 may generate resource requests for the K carriers as described below.

UE 110 may have a maximum transmit power of $P_{max}$, which may be determined based on the peak transmit power of UE 110 and a target back-off for a power amplifier at UE 110. The power amplifier may be able to transmit at the peak transmit power. However, an uplink signal transmitted by UE 110 may have a time-varying envelope, which may be quantified by a particular peak-to-average-power ratio (PAPR). To avoid clipping the peaks in the uplink signal, which may generate undesired intermodulation distortion, the power amplifier may be operated with an average transmit power that may be below the peak transmit power by the target back-off or more.

UE 110 may use some of its transmit power to send pilot and overhead information on each carrier. UE 110 may then have a total available transmit power of $P_{avail}$ for data transmission on the K carriers. The total available transmit power $P_{avail}$ may be expressed as:

$$P_{avail} = P_{max} - \sum_{k=1}^{K} P_{pilot,k} - \sum_{k=1}^{K} P_{oh,k}, \quad \text{Eq (1)}$$

where $P_{pilot,k}$ is the transmit power for pilot on carrier k, and $P_{oh,k}$ is the transmit power for overhead information on carrier k.

UE 110 may distribute the maximum transmit power or the total available transmit power across the K carriers in various manners. In a first design, UE 110 may distribute the maximum transmit power evenly across the K carriers, as follows:

$$P_k = \frac{P_{max}}{K}, \quad \text{Eq (2)}$$

for k = 1, ... , K, where $P_k$ is the allocated transmit power for carrier k. For the first design, the available transmit power for data transmission on carrier k may be given as $P_{avail,k} = P_k - P_{pilot,k} - P_{oh,k}$.

In a second design, UE 110 may distribute the total available transmit power evenly across the K carriers, as follows:

$$P_k = \frac{P_{avail}}{K}, \quad \text{Eq (3)}$$

for k = 1, ... , K.

For the second design, the available transmit power for data transmission on each carrier k may be equal to the allocated transmit power for carrier k, or $P_{avail,k} = P_k$.

For the first and second designs, UE 110 may limit the allocated transmit power for each subcarrier to $P_{max,k}$, which may be the transmit power needed to achieve the highest data rate supported by the system on carrier k. $P_{max,k}$ may be the same for all K carriers or may be different for different carriers.

In a third design, UE 110 may distribute the total available transmit power across the K carriers based on greedy filling. In this design, the K carriers may be ordered based on their channel conditions from best to worst. Channel conditions may be quantified as described below. After ordering, carrier 1 may be the best carrier, and carrier K may be the worst carrier. The K carriers may also be ordered based on a predetermined designation or some other criteria. In any case, UE 110 may distribute the total available transmit power to the K ordered carriers, one carrier at a time, starting with the best carrier. For a given carrier k selected for transmit power allocation, UE 110 may allocate $P_{max,k}$ to the selected carrier unless there is insufficient available transmit power, so that $P_k = \min\{P_{avail}, P_{max,k}\}$. UE 110 may update the total available transmit power after allocating transmit power to the selected carrier, so that $P_{avail} = P_{avail} - P_k$. UE 110 may then allocate the total available transmit power to the next carrier. UE 110 may repeat the process until all of the total available transmit power is used up or all K carriers have been allocated transmit power.

In a fourth design, UE 110 may distribute the total available transmit power unevenly across the K carriers based on water filling. The K carriers may observe different channel conditions and may have different received signal qualities. Received signal quality may be quantified by a signal-to-noise-and-interference ratio (SINR), an energy-per-chip-to-total-noise ratio ($E_c/N_t$), a carrier-to-interference ratio (C/I), etc. UE 110 may distribute the total available transmit power to the K carriers based on water filling such that the total data rate for the K carriers is maximized. Water filling is described in further detail below.

UE 110 may also distribute the maximum transmit power or the total available transmit power across the K carriers in other manners. For all designs, UE 110 may compute a requested power headroom for each carrier based on the allocated transmit power for that carrier, as follows:

$$T2P_{req,k} = \frac{P_k}{P_{pilot,k}}, \quad \text{Eq (4)}$$
for $k = 1, \ldots, K$,
and $$\beta_{req,k} = \log_{10}(T2P_{req,k}), \quad \text{Eq (5)}$$
for $k = 1, \ldots, K$, where $T2P_{req,k}$ is the requested power headroom for carrier k in linear unit, and $\beta_{req,k}$ is the requested power headroom for carrier k in decibel (dB).

For simplicity, equations (4) and (5) omit scaling and quantization effects. $T2P_{req,k}$ may be used for computation as described below. $\beta_{req,k}$ may be sent by UE 110 to Node B 120.

As shown in equation (4), power headroom may be given by a traffic-to-pilot ratio (T2P). The transmit power for pilot on each carrier may be adjusted by power control to account for channel conditions and to obtain the desired level of performance, e.g., a target packet error rate (PER). The power headroom for each carrier may thus convey channel conditions of the carrier. In general, power headroom may comprise any information indicative of an amount of transmit power that can be used for transmission and/or information indicative of channel conditions. T2P may be one exemplary type of information for power headroom. Other types of information for power headroom may also be used.

FIG. 2 shows a design of a resource request 200 for one carrier k. In the design shown in FIG. 2, resource request 200 includes a field 212 for the requested power headroom for carrier k, a field 214 for the total buffer status for UE 110, a field 216 for the highest priority logical channel identity (ID), and a field 218 for the buffer status for the highest priority logical channel. UE 110 may have one or more logical channels to carry data. The logical channels may be assigned different priorities based on the requirements of the data sent on the logical channels. The amount of data to send for the highest priority logical channel as well as the total amount of data to send by UE 110 may be conveyed in resource request 200.

As shown in FIG. 2, resource request 200 includes field 212 for power headroom information and fields 214, 216 and 218 for queue information. The power headroom information may be for a specific carrier whereas the queue information may be applicable for all K carriers. UE 110 may generate one resource request 200 for each carrier. The K resource requests for the K carriers may include different power headroom information but the same queue information. This may then result in redundant queue information being sent for the K carriers, which may be useful for a distributed scheduler.

In another design, queue information may be omitted from one or more resource requests for one or more carriers. For example, a resource request for a primary or designated carrier may include power headroom information and queue information whereas a resource request for each remaining carrier may include only power headroom information. This design may reduce the amount of redundant information to send in the resource requests for the K carriers.

In yet another design, the resource request shown in FIG. 2 may be used for each carrier. However, fields 214, 216 and/or 218 in one or more resource requests may be used to carry other information instead of queue information. For example, fields 214, 216 and/or 218 may be used to carry more bits for power headroom information to obtain better resolution. Fields 214, 216 and/or 218 may also be used to send a downlink SINR differential between a serving cell and other cells in an active set for UE 110. The downlink SINR differential may be indicative of interference to the other cells.

For all designs described above, UE 110 may send a requested power headroom for each of the K carriers. This may allow a distributed scheduler to obtain requested power headrooms from all UEs for each carrier to be scheduled independently. The requested power headrooms for the K carriers from UE 110 may also inform a joint scheduler of the difference in channel conditions across the K carriers. The information on the channel conditions across the K carriers may be used by the joint scheduler to redistribute the requested power headrooms, as described below.

A scheduler (e.g., at Node B 120 or RNC 130) may obtain the requested power headroom for each of the K carriers from UE 110. As shown in equation (4), the requested power headroom for each carrier may be given by a traffic-to-pilot ratio (T2P). The scheduler may be able to determine the allocated transmit power for each carrier based on the requested power headroom and in accordance with the design used by UE 110 to determine the requested power headroom. The scheduler may know the transmit power used by UE 110 to send overhead information on each carrier, which may be given by an overhead-to-pilot ratio (O2P). O2P may be selected to obtain the desired performance for overhead information and may be the same for all K carriers. For the transmit power distribution scheme shown in equation (2), the scheduler may determine the transmit power for pilot on each carrier k based on the known maximum transmit power for UE 110, the known O2P for UE 110, and the requested power headroom for carrier k received from UE 110, as follows:

$$P_{pilot,k} = \frac{P_{max}}{(1 + O2P + T2P_{req,k}) \cdot K}. \quad \text{Eq (6)}$$

The scheduler may then determine the available transmit power for data transmission on each carrier k as follows:

$$P_{avail,k} = P_{pilot,k} \cdot T2P_{req,k} \quad \text{Eq (7)}$$

The scheduler may schedule UE 110 for data transmission on the uplink based on $P_{avail,k}$ computed for each carrier. However, $P_{avail,k}$ is computed by UE 110 without taking into account certain considerations such as the load on the K carriers, a target load for each carrier, etc. Thus, scheduling UE 110 based on $P_{avail,k}$ computed by UE 110 may provide sub-optimal performance.

In an aspect, the scheduler may receive the requested power headroom for each of the K carriers from UE 110 and may redistribute the requested power headrooms across the K carriers based on one or more factors affecting performance. The scheduler may then schedule UE 110 for data transmission on the uplink based on the redistributed power headrooms for the K carriers, instead of the requested power headrooms sent by UE 110.

The scheduler may redistribute the requested power headrooms for the K carriers in various manners. In one design, the scheduler may determine the total available transmit power for UE 110 based on the requested power headrooms for the K carriers and may evenly redistribute the total available transmit power across the K subcarriers. In this design, the redistributed transmit powers for the K carriers are equal. In another design, the scheduler may redistribute the requested power headrooms for the K carriers based on water filling, or greedy filling, or some other algorithm. Redistribution based on water filling is described below. For all designs, the scheduler may obtain a redistributed power headroom for each of the K carriers for UE 110. The redistributed power headroom for each carrier may be equal to, smaller than, or larger than the requested power headroom for that carrier. The scheduler may then schedule UE 110 for data transmission on the uplink based on the redistributed power headrooms for the K carriers.

The scheduler may determine the redistributed power headrooms for the K carriers for a set of UEs desiring to transmit data on the uplink. The scheduler may schedule these UEs based on their redistributed power headrooms in various manners.

In a first scheduling design, which may be referred to as per carrier scheduling, the scheduler may perform scheduling independently for each of the K carriers. For each carrier k, the scheduler may sort or prioritize the UEs based on one or more metrics such as a proportional fair metric. The scheduler may then select one UE at a time for scheduling on carrier k, starting with the highest priority UE. The scheduler may allocate a granted power headroom for carrier k to the selected UE. For greedy filling, the granted power headroom may be up to the redistributed power headroom for carrier k for the selected UE and may be limited by the load on carrier k at Node B 120. The scheduler may repeat the process and may allocate a granted power headroom to each UE until all UEs have been scheduled on carrier k or all of the load on carrier k is used up. The scheduler may update the metric(s) for each UE after scheduling the UE with the granted power headroom. For example, the scheduler may determine a scaled total throughput for the UE based on the granted power headroom and may update the proportional fair metric for the UE based on the scaled total throughput.

In one design, the load on each carrier k may be limited by a target rise-over-thermal (RoT). For an interference-limited system such as a CDMA system, RoT may be dependent on the number of UEs simultaneously transmitting on the uplink, their transmit power levels, and their channel conditions. RoT may be maintained below a target level in order to avoid system instability.

For a given UE scheduled on carrier k, a total-energy-per-chip-to-total-noise ratio, $(E_c/N_t)_k$, for the UE at Node B 120 may be expressed as:

$$(E_c/N_t)_k = (E_{cp}/N_t)_k \cdot (1 + O2P_k + T2P_{granted,k}), \quad \text{Eq (8)}$$

where $E_{cp}$ is an energy-per-chip for pilot,
$E_c$ is a total-energy-per-chip for data, overhead, and pilot,
$N_t$ is total noise and interference observed by the UE at Node B 120,
$O2P_k$ is an overhead-to-pilot ratio for the UE, and
$T2P_{granted,k}$ is a granted power headroom for the UE.

A pilot-energy-per-chip-to-total-noise ratio, $(E_{cp}/N_t)_k$, for carrier k for the UE may be estimated based on the pilot transmitted by the UE on carrier k. The load due to the UE may be expressed as:

$$L_k = \frac{(E_c)_k}{I_0} = \frac{(E_c/N_t)_k}{1 + (E_c/N_t)_k}, \quad \text{Eq (9)}$$

where $(E_c)_k$ is a total-energy-per-chip for the UE on carrier k,
$I_0$ is the total noise and interference observed by Node B 120, and
$L_k$ is the load due to the UE on carrier k.

A target load for carrier k, $L_{total\_target}$, may be determined based on the target RoT, as follows:

$$L_{total\_target} = 1 - \frac{1}{RoT\_target}. \quad \text{Eq (10)}$$

The target RoT may be fixed or variable. If variable, the target RoT may be selected based on the number of UEs transmitting on the uplink, an f-factor, and/or other parameters. The f-factor may indicate what percentage of the load is due to UEs not served by Node B 120.

The available load for carrier k, $L_{avail,k}$, may be expressed as:

$$L_{avail,k} = L_{total\_target} - L_{other,k} \quad \text{Eq (11)}$$

where $L_{other,k}$ is the load on carrier k due to transmissions that are not controlled by the scheduler, e.g., non-scheduled transmissions, retransmissions, transmissions on dedicated channels, transmissions by UEs communicating with other Node Bs, etc.

The available load for carrier k may be updated after scheduling the UE with the granted power headroom, as follows:

$$L_{avail,k} = L_{avail,k} - L_k. \quad \text{Eq (12)}$$

$L_k$ is the load due to the UE being scheduled on carrier k and may be computed as shown in equation (9). The scheduler may schedule one UE at a time on carrier k until the available load for carrier k goes to zero or is too small for allocation.

In a second scheduling design, which may be referred to as per UE scheduling, the scheduler may perform scheduling for UEs across all K carriers. The scheduler may prioritize all UEs requesting data transmission on the uplink based on one or more metrics such as a proportional fair metric. The scheduler may determine a total requested throughput for each UE based on the redistributed power headrooms for the UE. The scheduler may then determine the proportional fair metric for each UE based on the total requested throughput and the total served throughput for the UE. The scheduler may obtain a single priority list containing all UEs, which may be sorted based on their proportional fair metrics.

The scheduler may then select one UE at a time for scheduling on all K carriers, starting with the highest priority UE. The scheduler may allocate a granted power headroom for each carrier to the selected UE. For greedy filling, the granted power headroom for each carrier may be up to the redistributed power headroom for that carrier for the UE and may be limited by the available load on the carrier at Node B 120. The scheduler may repeat the process and allocate granted power headrooms for the K carriers to each UE until all UEs have been scheduled or all of the available load on the K carriers is used up. The scheduler may also allocate granted power headrooms to the UEs based on other considerations. The scheduler may update the metric(s) for each UE and may also update the load on the K carriers after scheduling the UE with the granted power headrooms.

In a third scheduling design, which may be referred to as per UE scheduling with iterative redistribution, the scheduler may perform scheduling for one UE at a time across all K carriers and may redistribute power headrooms after scheduling each UE. The scheduler may redistribute the requested power headrooms of each UE requesting data transmission on the uplink and may determine one or more metrics for each UE based on its redistributed power headrooms. For example, the scheduler may determine a total requested throughput for each UE based on its redistributed power headrooms and may determine the proportional fair metric for the UE based on the total requested throughput and the total served throughput for the UE. The scheduler may prioritize all UEs requesting data transmission on the uplink based on their proportional fair metrics and may obtain a single priority list containing all UEs.

The scheduler may then select the highest priority UE in the priority list for scheduling. The scheduler may allocate a granted power headroom for each carrier to the selected UE. For greedy filling, the granted power headroom for each carrier may be up to the redistributed power headroom for that carrier for the UE and may be limited by the available load on the carrier at Node B 120. After scheduling the UE, the scheduler may repeat (i) redistributing the requested power headrooms for each remaining UE in the priority list, (ii) prioritizing the remaining UEs based on their redistributed power headrooms, and (iii) scheduling the highest priority UE in the list. The scheduler may perform redistribution based on water filling for the first iteration and based on greedy filling for each subsequent iteration in order to reduce complexity. The redistribution for each UE may be dependent on the available load on each of the K carriers, which may change whenever a UE is scheduled. The third scheduling design may thus be considered as a refinement of the second scheduling design.

The scheduler may also perform scheduling in other manners. For all scheduling designs, the scheduler may allocate granted power headrooms to the UEs based on other considerations. For example, the scheduler may allocate granted power headrooms to minimize usage of an Enhanced Dedicated Channel (E-DCH) Absolute Grant Channel (E-AGCH), which may be used to send the granted power headrooms to the UEs. This may be achieved by allocating larger grants and/or avoiding small grants whenever possible.

As noted above, the scheduler may redistribute the requested power headrooms for the K carriers for each UE prior to scheduling. In one design, the redistribution may be based on greedy filling. In this design, the K carriers may be ordered based on their channel conditions, from best to worst. The scheduler may then redistribute the requested power headrooms to the K ordered carriers, one carrier at a time, starting with the best carrier. For a given carrier k selected for redistribution, the scheduler may allocate a granted power headroom that may be as high as possible. The maximum allowed power headroom for each carrier k may be given as:

$$T2P_{max,k} = \min(T2P_{max}, T2P_{max,k,load}), \quad \text{Eq (13)}$$

where $T2P_{max}$ is the power headroom for the highest data rate supported by the system, $T2P_{max,k,load}$ is the highest data rate supported by the available load on carrier k, and $T2P_{max,k}$ is the maximum allowed power headroom for carrier k.

$T2P_{max}$ may be the same for all K carriers and may be a static parameter. $T2P_{max,k,load}$ may be different for different carriers and may be a dynamic parameter that may change whenever a UE is scheduled on carrier k. The redistributed power headroom, $T2P_{gf,k}$, for each carrier based on greedy filling may then be constrained as follows:

$$0 \leq T2P_{gf,k} \leq T2P_{max,k}. \quad \text{Eq (14)}$$

The scheduler may update the available load on each carrier after allocating a granted power headroom for the carrier to the UE. The scheduler may also update the power headrooms for the UE. The scheduler may then allocate a granted power headroom for the next best carrier to the UE. The scheduler may repeat the process until the requested power headrooms for all K carriers have been redistributed or the available load for all K carriers have been allocated.

In another design, the redistribution may be based on water filling. Water filling is analogous to pouring a fixed amount of water into a vessel with an irregular bottom. The amount of water may correspond to the total available transmit power, and each carrier may correspond to a point on the bottom of the vessel. The elevation of the bottom at any given point may correspond to the inverse of the SINR of a carrier associated with that point. A low elevation may thus correspond to a high SINR, and vice versa. The total available transmit power may then be "poured" into the vessel such that lower points in the vessel (which correspond to higher SINRs) are filled first, and higher points in the vessel (which correspond to lower SINRs) are filled later. The power distribution may be dependent on the total available transmit power and the depth of the vessel over the bottom surface.

Redistribution of the requested power headrooms for one UE (e.g., UE 110) based on water filling may be performed as follows. Redistribution may be performed such that the total throughput or data rate for the K carriers for UE 110 is maximized. In this case, redistribution may be performed such that it maximizes following objective function:

$$J = \sum_{k=1}^{K} f(T2P_{wf,k}), \quad \text{Eq (15)}$$

where $T2P_{wf,k}$ is the redistributed power headroom with water filling, $f(T2P_{wf,k})$ is a function that provides a data rate achievable with $T2P_{wf,k}$, and J is the objective function to maximize.

Function $f(T2P_{wf,k})$ may include the performance of hybrid automatic retransmission (HARQ) and/or other schemes used for data transmission. Function $f(T2P_{wf,k})$ may be assumed to be monotonically increasing with respect to $T2P_{wf,k}$, so that $f'(T2P_{wf,k})>0$. Function $f(T2P_{wf,k})$ may also be assumed to be concave with respect to $T2P_{wf,k}$, so that $f''(T2P_{wf,k}) \leq 0$.

The transmit power may be constrained to ensure that the total transmit power does not exceed $P_{max}$. If the requested power headrooms are obtained by distributing $P_{max}$ evenly across the K carriers, then the transmit power may be constrained as follows:

$$\sum_{k=1}^{K} \frac{P_{max}}{\left(\frac{1+O2P+}{T2P_{req,k}}\right) \cdot K} \cdot (1+O2P+T2P_{wf,k}) \leq P_{max}. \quad \text{Eq (16)}$$

Equation (16) may be simplified as follows:

$$\sum_{k=1}^{K} \frac{1+O2P+T2P_{wf,k}}{1+O2P+T2P_{req,k}} \leq K. \quad \text{Eq (17)}$$

The maximum allowed power headroom for each carrier k may be $T2P_{max,k}$, which may be defined as shown in equation (13). The redistributed power headroom for each carrier k may then be constrained as follows:

$$0 \leq T2P_{wf,k} \leq T2P_{max,k}. \quad \text{Eq (18)}$$

A Lagrange equation L for the objective function J may be expressed as:

$$L = J - \lambda \cdot \left(\sum_{k=1}^{K} \frac{1+O2P+T2P_{wf,k}}{1+O2P+T2P_{req,k}} - K\right) + \sum_{k=1}^{K} \mu_k \cdot \quad \text{Eq (19)}$$

$$T2P_{wf,k} - \sum_{k=1}^{K} \alpha_k \cdot (T2P_{wf,k} - T2P_{max,k})$$

$$= \sum_{k=1}^{K} f(T2P_{wf,k}) - \lambda \cdot \left(\sum_{k=1}^{K} \frac{1}{1+O2P+T2P_{req,k}} - K\right) +$$

$$\sum_{k=1}^{K} \mu_k \cdot T2P_{wf,k} - \sum_{k=1}^{K} \alpha_k \cdot (T2P_{wf,k} - T2P_{max,k})$$

where
$\mu_k$ is a shadow price of $T2P_{wf,k}$ and is positive if and only if $T2P_{wf,k}=0$,
$\alpha_k$ is a shadow price of $T2P_{max,k}$ and is positive if and only if $T2P_{wf,k}=T2P_{max,k}$, and
$\lambda$ is a shadow price of K.

The shadow prices $\lambda$, $\mu_k$ and $\alpha_k$ are non-negative values and are indicative of a change in the objective function J with small deviations from the constraints $P_{max}$, $T2P_{wf,k}=0$, and $T2P_{wf,k}=T2P_{max,k}$, respectively.

The objective function J may be maximized by taking the partial derivative of L with respect to $T2P_{wf,k}$ and setting the partial derivative to zero, which may then provide the following:

$$\frac{\partial f(T2P_{wf,k})}{\partial T2P_{wf,k}} - \frac{\lambda}{1+O2P+T2P_{req,k}} + \mu_k - \alpha_k = 0. \quad \text{Eq (20)}$$

When $0<T2P_{wf,k}<T2P_{max,k}$, the shadow prices become $\mu_k=0$ and $\alpha_k=0$, and the partial derivative in equation (20) may be expressed as:

$$\frac{\partial f(T2P_{wf,k})}{\partial T2P_{wf,k}} = \frac{\lambda}{1+O2P+T2P_{req,k}}. \quad \text{Eq (21)}$$

The K carriers may be separated into three groups. Group 1 may include carriers for which the maximum allowed power headroom is allocated, or $T2P_{wf,k}=T2P_{max,k}$. Group 2 may include carriers for which $0<T2P_{wf,k}<T2P_{max,k}$. Group 3 may include carriers for which no transmit power is allocated, or $T2P_{wf,k}=0$. The granted power headroom for each carrier in group 2 may be determined as shown in equation (21).

The solutions to water filling may have the following structural properties. For property 1, the maximum data rate may be obtained when $T2P_{wf,k}=T2P_{max,k}$ for all K carriers and group 1 includes all K carriers, so that $$\sum_{k=1}^{K} \frac{1+O2P+T2P_{wf,k}}{1+O2P+T2P_{req,k}} = K.$$

For property 2, across all K carriers, higher $T2P_{wf,k}$ may be allocated to carriers with better channel conditions if allowed by the load on the carriers. Hence, if $T2P_{req,k}>T2P_{req,l}$ and $T2P_{max,k}>T2P_{max,l}$, then $T2P_{wf,k}>T2P_{wf,l}$. Property 2 may be inferred from the monotonicity and concavity of function $f(T2P_{wf,k})$. The K carriers may thus be ordered by their channel quality. For property 3, for a given carrier k1 in group 1, carrier k2 in group 2, and carrier k3 in group 3, the following may be expressed:

$$T2P_{req,k1} \cdot \frac{\partial f(T2P_{wf,k1})}{\partial T2P_{wf,k1}} > \quad \text{Eq (22)}$$

$$T2P_{req,k2} \cdot \frac{\partial f(T2P_{wf,k2})}{\partial T2P_{wf,k2}} > T2P_{req,k3} \cdot \frac{\partial f(T2P_{wf,k3})}{\partial T2P_{wf,k3}}.$$

Property 3 may imply that $T2P_{wf,1}>0$.

For redistribution by water filling, each of the K carriers may be placed in one group. If $T2P_{req,k}$ and $T2P_{max,k}$ are aligned (or if $T2P_{max,k}>T2P_{max,k'}$ when $T2P_{req,k}>T2P_{req,k'}$), then the channel quality of the K carriers may be ordered to reduce the number of combinations to consider. Otherwise, if there is no order among the K carriers, then the number of combinations to evaluate may be larger.

Function $f(T2P_{wf,k})$ may map a redistributed power headroom to a data rate and may be based on a constrained capacity function, an unconstrained capacity function, or some other function. In one design, function $f(T2P_{wf,k})$ may be an unconstrained capacity function and may be expressed as:

$$f(T2P_{wf,k}) = W \log_2(1+\gamma_{pilot,k} \cdot T2P_{wf,k}), \quad \text{Eq (23)}$$

where $\gamma_{pilot,k}$ is the SINR of pilot on carrier k, and W is the system bandwidth.

The redistributed power headroom may then be selected to satisfy the following condition:

$$\frac{W \cdot \gamma_{pilot,k}}{1 + \gamma_{pilot,k} \cdot T2P_{wf,k}} = \frac{\lambda}{1 + O2P + T2P_{req,k}} - \mu_k + \alpha_k. \quad \text{Eq (24)}$$

For each carrier with $0 < T2P_{wf,k} < T2P_{max,k}$, equation (24) may be simplified as follows:

$$\frac{W \cdot \gamma_{pilot,k}}{1 + \gamma_{pilot,k} \cdot T2P_{wf,k}} = \frac{\lambda}{1 + O2P + T2P_{req,k}}. \quad \text{Eq (25)}$$

From equation (25), the redistributed power headroom for carrier k may be computed as:

$$T2P_{wf,k} = \frac{(1 + O2P + T2P_{req,k}) \cdot W}{\lambda} - \frac{1}{\gamma_{pilot,k}}. \quad \text{Eq (26)}$$

The SINR of carrier k, $\gamma_{wf,k}$, may then be expressed as:

$$\gamma_{wf,k} = \gamma_{pilot,k} \cdot T2P_{wf,k}. \quad \text{Eq (27)}$$

In general, $T2P_{wf,k}$ may be dependent on the particular function used for $f(T2P_{wf,k})$ and may be determined based on equation (21).

There is no closed-form solution to redistribution based on water filling. However, the monotonic and concave characteristics of function $f(T2P_{wf,k})$ and the relationship between $\gamma_{wf,k}$ and $T2P_{wf,k}$ imply that a carrier that is allocated $T2P_{wf,k} = T2P_{max,k}$ should be better than a carrier that is allocated $0 < T2P_{wf,k} < T2P_{max,k}$, which should be better than a carrier that is allocated $0 = T2P_{wf,k}$. This observation may be exploited to iteratively redistribute the requested power headrooms across the K carriers. If $f(T2P)$ is linear at $T2P_{max}$, then the iteration may simply reduce to greedy filling.

For a case of two carriers, redistribution based on water filling may be simplified as follows. The two carriers may be sorted such that $T2P_{req,1} \geq T2P_{req,2}$. Redistribution may result in one of the five possible allocations listed in Table 1.

TABLE 1

Possible Allocations for Two Carriers

| | $T2P_{wf,1}$ | $T2P_{wf,2}$ |
|---|---|---|
| Allocation 1 | $T2P_{wf,1} = T2P_{max,1}$ | $T2P_{wf,2} = T2P_{max,2}$ |
| Allocation 2 | $T2P_{wf,1} = T2P_{max}$ | $0 \leq T2P_{wf,2} \leq T2P_{max}$ |
| Allocation 3 | $0 < T2P_{wf,1} < T2P_{max,1}$ | $T2P_{wf,2} = T2P_{max,2}$ |
| Allocation 4 | $0 < T2P_{wf,1} < T2P_{max,1}$ | $T2P_{wf,2} = 0$ |
| Allocation 5 | $0 < T2P_{wf,1} < T2P_{max,1}$ | $0 < T2P_{wf,2} < T2P_{max,2}$ |

Redistribution may be performed with the following sequence of steps.

In step 1, the following condition may be checked:

$$\frac{1 + O2P + T2P_{max,1}}{1 + O2P + T2P_{req,1}} + \frac{1 + O2P + T2P_{max,2}}{1 + O2P + T2P_{req,2}} \leq 2. \quad \text{Eq (28)}$$

If the condition in equation (28) is satisfied, then allocation 1 in Table 1 is optimal. Otherwise, in step 2, the following condition may be checked:

$$\frac{1 + O2P + T2P_{max,1}}{1 + O2P + T2P_{req,1}} \leq 2. \quad \text{Eq (29)}$$

If the condition in equation (29) is satisfied, then $T2P_{wf,1} = T2P_{max,1}$ may be assumed, and $T2P_{wf,2}$ may be determined such that the following is satisfied:

$$\frac{1 + O2P + T2P_{max,1}}{1 + O2P + T2P_{req,1}} + \frac{1 + O2P + T2P_{wf,2}}{1 + O2P + T2P_{req,2}} = 2. \quad \text{Eq (30)}$$

The following condition may then be checked:

$$(1 + O2P + T2P_{req,2}) \frac{\partial f(T2P_{wf,2})}{\partial T2P_{wf,2}} \bigg|_{T2P_{wf,2}} < \quad \text{Eq (31)}$$
$$(1 + O2P + T2P_{req,1}) \frac{\partial f(T2P_{wf,1})}{\partial T2P_{wf,1}} \bigg|_{T2P_{max,1}}.$$

If the condition in equation (31) is satisfied, then allocation 2 in Table 1 is optimal. The allocation of $T2P_{wf,1} = T2P_{max,1}$ and $T2P_{wf,2} = 0$ may be a corner case when $$\frac{1 + O2P + T2P_{max,1}}{1 + O2P + T2P_{req,1}} = 2.$$

If the condition in equation (29) or (31) is not satisfied, then in step 3, the following condition may be checked:

$$\frac{1 + O2P + T2P_{max,2}}{1 + O2P + T2P_{req,2}} \leq 2. \quad \text{Eq (32)}$$

If the condition in equation (32) is satisfied, then $T2P_{wf,2} = T2P_{max,2}$ may be assumed, and $T2P_{wf,1}$ may be determined such that the following is satisfied:

$$\frac{1 + O2P + T2P_{wf,1}}{1 + O2P + T2P_{req,1}} + \frac{1 + O2P + T2P_{max,2}}{1 + O2P + T2P_{req,2}} = 2. \quad \text{Eq (33)}$$

The following condition may then be checked:

$$(1 + O2P + T2P_{req,1}) \frac{\partial f(T2P_{wf,1})}{\partial T2P_{wf,1}} \bigg|_{T2P_{wf,1}} < \quad \text{Eq (34)}$$
$$(1 + O2P + T2P_{req,2}) \frac{\partial f(T2P_{wf,2})}{\partial T2P_{wf,2}} \bigg|_{T2P_{max,2}}.$$

If the condition in equation (34) is satisfied, then allocation 3 in Table 1 is optimal. Otherwise, if the condition in equation (32) or (34) is not satisfied, then in step 4, the following condition may be checked:

$$\frac{1 + O2P + T2P_{max,1}}{1 + O2P + T2P_{req,1}} \geq 2. \quad \text{Eq (35)}$$

If the condition in equation (35) is satisfied, then $1+O2P+T2P_{wf,1}=2(1+O2P+T2P_{req,1})$ may be assumed, and the following condition may be checked:

$$(1 + O2P + T2P_{req,1})\frac{\partial f(T2P_{wf,1})}{\partial T2P_{wf,1}}\bigg|_{T2P_{wf,1}} > \qquad \text{Eq (36)}$$

$$(1 + O2P + T2P_{req,2})\frac{\partial f(T2P_{wf,2})}{\partial T2P_{wf,2}}\bigg|_{T2P_{wf,2}=0}.$$

If the condition in equation (36) is satisfied, then allocation 4 in Table 1 is optimal. Otherwise, if the condition in equation (35) or (36) is not satisfied, then both carriers 1 and 2 may be placed in group 2, and $T2P_{wf,1}$ and $T2P_{wf,2}$ may be determined as shown in equation (21). If the solution does not violate any constraint, then allocation 3 in Table 1 is optimal. Otherwise, step 5 may be repeated by considering the violated constraints. Steps 4 and 5 are separated to allow for a positive $\mu_2$.

The computation described above may be simplified by making certain approximations. Function $f(T2P)$ and pilot SINR $\gamma_{pilot,k}$ may be based on average behavior across channel models. However, in practice, T2P may be constrained to be one of a set of discrete values corresponding to a set of data rates supported by the system. The partial derivative may then be approximated as follows:

$$\frac{\partial f(T2P_j)}{\partial T2P_j} = \frac{f(T2P_j) - f(T2P_{j-1})}{T2P_j - T2P_{j-1}}, \qquad \text{Eq (37)}$$

where j is a rate index, and $T2P_j$ is a T2P required for the j-th supported data rate. $f(T2P)$ and/or $$\frac{\partial f(T2P)}{\partial T2P}$$

may also be approximated with discrete functions of T2P, which may be defined based on simple formulas.

Redistribution of requested power headrooms based on water filling has been described above. The requested power headrooms may be received from UE 110 and may be operated on directly, as described above. In another design, the requested power headrooms may be converted to a total available transmit power. Redistribution may then be performed based on the total available transmit power.

UE 110 may be scheduled on one or more carriers. UE 110 may also be allocated a granted power headroom on each carrier, which may be (i) a positive value if UE 110 is scheduled on the carrier or (ii) zero if UE 110 is not scheduled on the carrier. Because of redistribution, the granted power headroom for each carrier may be equal to, or higher than, or lower than the requested power headroom for that carrier. However, the total granted throughput may be equal to or less than the total requested throughput and may be limited by $P_{max}$ at UE 110.

Redistribution of requested power headrooms and scheduling of UEs on multiple carriers may be performed as described above. Redistribution and scheduling may also be performed by taking into account other considerations. For example, the sensitivity of $f(T2P)$ and $\gamma_{pilot,k}$ to different channel models and HARQ performance may be considered. Usage of the E-AGCH to send resource grants to the scheduled UEs may also be considered. QoS UEs with delay constraint and frequency diversity may also be considered. A target T2P may be selected based on the number of multi-carrier UEs.

In general, a given UE may be scheduled on one or more carriers when multiple carriers are available. A decision to schedule the UE on one or multiple carriers may be dependent on the particular scheduling algorithm used to schedule the UE. A proportional fair scheduler may prioritize UEs based on total throughput across all carriers. In determining whether the given UE should be scheduled on one or multiple carriers, as a fair comparison, the total throughputs of multi-carrier UEs should not be scaled differently from the total throughputs of single-carrier UEs. In this case, system-wide fairness may be unaffected by the number of carriers on which each UE is scheduled.

UEs may be scheduled for data transmission on the uplink based on time division multiplexing (TDM) or code division multiplexing (CDM). For TDM-based scheduling, UEs may be scheduled for approximately equal amount of time to achieve fairness. As an example, there may be M dual-carrier UEs in the system, $N_1$ single-carrier UEs on carrier 1, and $N_2$ single-carrier UEs on carrier 2. Without loss of generality, a load-balanced case may be considered with $|N_1-N_2| \le 1$ and additive white Gaussian noise (AWGN) channel. Based on static calculation, the fraction of service time for each dual-carrier UE may be $$\frac{M + N_2 - N_1}{M \cdot (M + N_2 + N_1)}$$

on carrier 1, $$\frac{M + N_1 - N_2}{M \cdot (M + N_2 + N_1)}$$

on carrier 2, and $$\frac{2}{M + N_2 + N_1}$$

on both carriers. The fraction of service time for each single-carrier UE may be $$\frac{2}{M + N_2 + N_1},$$

which may be equal to the total service time for each dual-carrier UE. Fairness may thus be maintained between single-carrier UEs and dual-carrier UEs. Dual-carrier allocation may provide load balancing for the case with full-buffer UEs in the system.

For CDM-based scheduling, multiple UEs may be scheduled concurrently on the same carrier. In this case, the system may be interference limited so that the SINR of each UE may be quite low. As an example, for two UEs with equal received power at a Node B, each UE may achieve an SINR of about 0 dB. These two UEs may be scheduled on different carriers, and each UE may be able to achieve a much higher SINR. When multiple UEs are scheduled concurrently on the same carrier, the Node B may recover the uplink transmission from one UE at a time with interference cancellation. Interference cancellation may improve the SINR of each UE recovered after the first UE.

Scheduling a UE for data transmission on multiple carriers on the uplink may provide certain benefits. First, higher overall throughput may be achieved for the UE by transmitting on multiple carriers instead of a single carrier. Second, better QoS and less latency may be achieved by using multiple carriers. Third, improved SINR efficiency may be achieved since a capacity curve for data rate versus SINR is typically concave. Hence, distributing transmit power among multiple carriers may result in a higher overall data rate than using all of the transmit power on a single carrier. Fourth, multi-carrier allocation may be able to fill the available load on each carrier, which may not be filled otherwise due to limitation in the amount of data or the peak data rate supported by the UE.

FIG. 3 shows a design of a process 300 for scheduling data transmission in a wireless communication system. Process 300 may be performed by a scheduler, which may reside at a base station/Node B or some other network entity. The scheduler may receive requested power headrooms for a plurality of carriers from a UE, one requested power headroom for each carrier (block 312). Each requested power headroom may be indicative of transmit power usable by the UE for transmission on an associated carrier. In one design, the requested power headrooms for the plurality of carriers may be obtained by the UE by distributing a maximum transmit power for the UE evenly across the plurality of carriers, e.g., as shown in equation (2). The requested power headrooms may also be obtained by the UE in other manners, as described above. The scheduler may also receive queue information indicative of data to transmit by the UE (block 314).

The scheduler may redistribute the requested power headrooms across the plurality of carriers to obtain redistributed power headrooms for the plurality of carriers (block 316). The scheduler may then schedule the UE for data transmission on the uplink based on the redistributed power headrooms for the plurality of carriers (block 318). The UE may also be scheduled based further on the queue information, which may be used to determine the priority of the UE. From block 318, the scheduler may obtain at least one granted power headroom for at least one carrier. The scheduler may send at least one resource grant comprising the at least one granted power headroom for the at least one carrier to the UE (block 320).

In one design of block 316, the scheduler may redistribute the requested power headrooms unevenly across the plurality of carriers. For example, the scheduler may redistribute the requested power headrooms to the plurality of carriers based on the channel conditions of the plurality of carriers and may allocate higher power headrooms to carriers having better channel conditions.

In one specific design of block 316, the scheduler may redistribute the requested power headrooms across the plurality of carriers based on water filling and further on a capacity function of data rate versus power headroom. The capacity function may be approximated with a discrete function and/or the partial derivative of the capacity function may be approximated with another discrete function. The scheduler may select one of a plurality of possible allocations based on a set of conditions for water filling, e.g., as shown in equations (28) to (36). The scheduler may then redistribute the requested power headrooms to the plurality of carriers in accordance with the selected allocation. The scheduler may also perform water filling in other manners, as described above.

In another specific design of block 316, the scheduler may redistribute the requested power headrooms across the plurality of carriers based on greedy filling. The scheduler may order the plurality of carriers from best to worst based on the channel conditions of the plurality of carriers. The scheduler may then select one carrier at a time to allocate power headroom, starting with the best carrier. The scheduler may allocate a maximum allowed power headroom as a redistributed power headroom for the selected carrier. The scheduler may then repeat the selecting and the allocating steps until the requested power headrooms are fully used or all subcarriers have been allocated power headrooms.

For all designs of block 316, the scheduler may limit the redistributed power headroom for each carrier to (i) the maximum power headroom for a highest data rate supported by the system and/or (ii) the maximum power headroom determined by the available load on the carrier, e.g., as shown in equations (13) and (14).

In one design of block 318, the scheduler may perform per carrier scheduling for each carrier separately. The scheduler may allocate a granted power headroom to each carrier based on a redistributed power headroom for the carrier.

In another design of block 318, the scheduler may perform per UE scheduling. The scheduler may sort a plurality of UEs requesting data transmission on the uplink based on the priorities of the UEs. The scheduler may select one UE at a time for scheduling, starting with the highest priority UE. The scheduler may then allocate at least one granted power headroom for at least one carrier to the selected UE.

In yet another design of block 318, the scheduler may perform per UE and iterative redistribution scheduling. The scheduler may perform redistribution and scheduling for a plurality of iterations for a plurality of UEs requesting data transmission on the uplink. For each iteration, the scheduler may perform redistribution based on the available load for each of the plurality of carriers and may perform scheduling for the highest priority UE in the iteration.

The scheduler may also perform scheduling in other manners for block 318. For all designs, the scheduler may allocate at least one granted power headroom for at least one carrier to the UE based on the redistributed power headrooms for the plurality of carriers. A granted power headroom for a given carrier may be higher than a requested power headroom for the carrier.

FIG. 4 shows a design of a process 400 for transmitting data in a wireless communication system. Process 400 may be performed by a UE (as described below) or by some other entity. The UE may determine requested power headrooms for a plurality of carriers, one requested power headroom for each carrier (block 412). In one design, the UE may distribute a maximum transmit power for the UE evenly across the plurality of carriers to obtain an allocated transmit power for each carrier, e.g., as shown in equation (2). The UE may then determine a requested power headroom for each carrier based on the allocated transmit power for the carrier, e.g., as shown in equation (4). The UE may also determine the requested power headrooms in other manners, as described above.

The UE may determine queue information indicative of data to transmit by the UE (block 414). The UE may send the requested power headrooms for the plurality of carriers and the queue information (block 416). In one design, the UE may generate a plurality of resource requests for the plurality of carriers, one resource request for each carrier. The resource request for each carrier may include the requested power headroom for the carrier. In one design, each resource request may further include the queue information. In another design, only one resource request may include the queue information, and additional information may be sent in each resource request that does not include the queue information.

The UE may receive at least one resource grant comprising at least one granted power headroom for at least one carrier among the plurality of carriers (block 418). The UE may send data on the at least one carrier in accordance with the at least one granted power headroom (block 420).

FIG. 5 shows a design of a process 500 for scheduling data transmission in a wireless communication system. Process 500 may be performed by a scheduler, which may reside at a base station/Node B or some other network entity. The scheduler may receive requested power headrooms for a plurality of carriers from a UE, one requested power headroom for each carrier (block 512). The scheduler may determine total available transmit power for data transmission on the plurality of carriers by the UE (block 514). In general, the total available transmit power may be determined based on the requested power headrooms (if received from the UE) or based on some other information received from the UE.

The scheduler may distribute the total available transmit power unevenly across the plurality of carriers to obtain an available transmit power for each carrier (block 516). For example, the scheduler may distribute the total available transmit power across the plurality of carriers based on water filling, greedy filling, or some other scheme. The scheduler may distribute the total available transmit power across the plurality of carriers based on the channel conditions of the plurality of carriers and may allocate more transmit power to carriers with better channel conditions.

The scheduler may then schedule the UE for data transmission on the uplink based on the available transmit power for each of the plurality of carriers (block 518). For example, the schedule may allocate a granted transmit power for each of at least one carrier based on the available transmit power for the carrier. The scheduler may determine a granted power headroom for each of the at least one carrier based on the granted transmit power for the carrier (block 520). The scheduler may then send information indicative of the granted power headroom for each of the at least one carrier to the UE (block 522).

FIGS. 3 and 5 show two designs of transmit power distribution/redistribution and scheduling by a scheduler. Transmit power distribution/redistribution and scheduling may also be performed in other manners by the scheduler.

The techniques described herein may be used for various systems and radio technologies, as mentioned above. The techniques may be used for multi-carrier High-Speed Packet Access (HSPA) in 3GPP. HSPA includes High-Speed Downlink Packet Access (HSDPA) defined in 3GPP Release 5 as well as High-Speed Uplink Packet Access (HSUPA) defined in 3GPP Release 6. HSDPA and HSUPA are sets of channels and procedures that enable high-speed packet data transmission on the downlink and uplink, respectively. For HSPA, UE 110 may send resource requests for the multiple carriers on an E-DCH Dedicated Physical Control Channel (E-DPCCH). UE 110 may receive absolute grants for the multiple carriers on an E-DCH Absolute Grant Channel (E-AGCH) and/or relative grants on an E-DCH Relative Grant Channel (E-RGCH). UE 110 may send data on an E-DCH Dedicated Physical Data Channel (E-DPDCH) in accordance with the grants.

Figure 6:
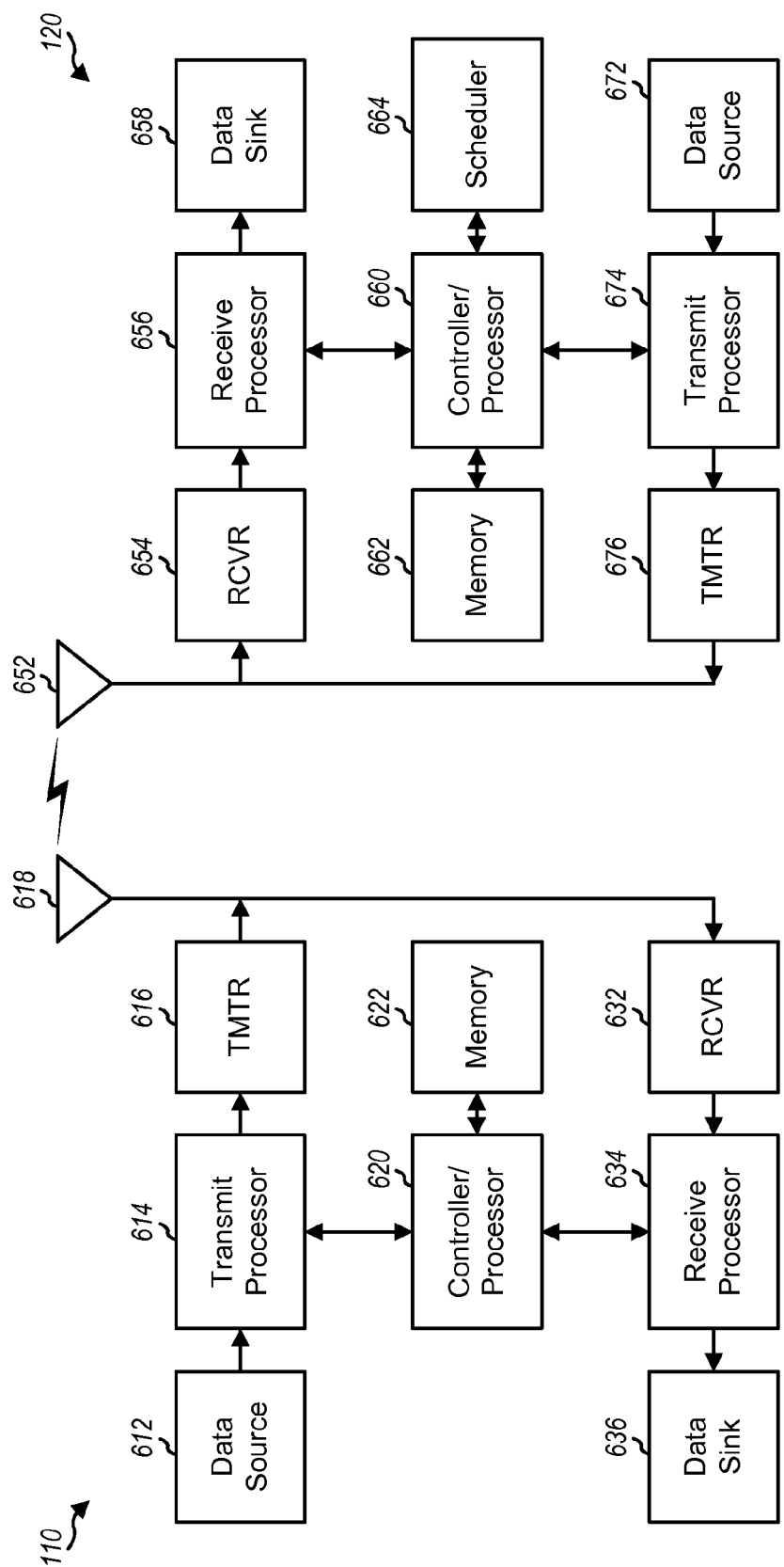
FIG. 6 shows a block diagram of a UE and a Node B.

FIG. 6 shows a block diagram of a design of UE 110 and Node B 120. At UE 110, a transmit processor 614 may receive data from a data source 612 and control information (e.g., resource requests) from a controller/processor 620. Transmit processor 614 may process (e.g., encode and symbol map) the data and control information, generate pilot for each carrier, perform modulation (e.g., for CDMA, etc.), and provide output samples. A transmitter (TMTR) 616 may condition (e.g., convert to analog, filter, amplify, and upconvert) the output samples and generate an uplink signal, which may be transmitted via an antenna 618.

At Node B 120, an antenna 652 may receive the uplink signals from UE 110 and other UEs and may provide a received signal to a receiver (RCVR) 654. Receiver 654 may condition (e.g., amplify, filter, downconvert, and digitize) the received signal and provide input samples. A receive processor 656 may perform demodulation on the input samples (e.g., for CDMA, etc.) and may demodulate and decode the resultant symbols to obtain decoded data and control information sent by UE 110 and other UEs. Receive processor 656 may provide the decoded data to a data sink 658 and the decoded control information to a controller/processor 660.

On the downlink, a transmit processor 674 at Node B 120 may receive data for UEs from a data source 672 and control information (e.g., resource grants) from controller/processor 660. The data and control information may be processed (e.g., encoded, symbol mapped, and modulated) by transmit processor 674 and further conditioned by a transmitter 676 to generate a downlink signal, which may be transmitted via antenna 652. At UE 110, the downlink signal from Node B 120 may be received by antenna 618, conditioned by a receiver 632, and demodulated and decoded by a transmit processor 634 to recover data and control information sent to UE 110.

Controllers/processors 620 and 660 may direct the operation at UE 110 and Node B 120, respectively. Processor 620 and/or other processors and modules at UE 110 may perform or direct process 400 in FIG. 4 and/or other processes for the techniques described herein. A scheduler 664 may be part of Node B 120 as shown in FIG. 6, may schedule UEs for data transmission on the downlink and/or uplink, and may assign resources to the scheduled UEs. Scheduler 664 and/or other processors and modules at Node B 120 may perform or direct process 300 in FIG. 3, process 500 in FIG. 5, and/or other processes for the techniques described herein. Scheduler 664 may also be external to Node B 120 (not shown in FIG. 6). Memories 622 and 662 may store program code and data for UE 110 and Node B 120, respectively.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of scheduling data transmission in a wireless communication system, comprising:
   receiving requested power headrooms for a plurality of carriers from a user equipment (UE), one requested power headroom for each carrier, each requested power headroom indicative of transmit power usable by the UE for transmission on an associated carrier;
   redistributing the requested power headrooms across the plurality of carriers to obtain redistributed power headrooms for the plurality of carriers; and
   scheduling the UE for data transmission on uplink based on the redistributed power headrooms for the plurality of carriers.

2. The method of claim 1, wherein the requested power headrooms for the plurality of carriers are obtained by the UE by distributing a maximum transmit power for the UE evenly across the plurality of carriers.

3. The method of claim 1, wherein the redistributing the requested power headrooms comprises redistributing the requested power headrooms unevenly across the plurality of carriers.

4. The method of claim 1, wherein the redistributing the requested power headrooms comprises redistributing the requested power headrooms to the plurality of carriers based on channel conditions of the plurality of carriers, with carriers having better channel conditions being allocated higher power headrooms.

5. The method of claim 1, wherein the redistributing the requested power headrooms comprises redistributing the requested power headrooms to the plurality of carriers based on load and target load of each of the plurality of carriers.

6. The method of claim 1, wherein the redistributing the requested power headrooms comprises redistributing the requested power headrooms across the plurality of carriers based on water filling.

7. The method of claim 6, wherein the redistributing the requested power headrooms comprises redistributing the requested power headrooms across the plurality of carriers based further on a capacity function of data rate versus power headroom.

8. The method of claim 7, wherein the capacity function is approximated with a first discrete function, or a partial derivative of the capacity function is approximated with a second discrete function, or both.

9. The method of claim 6, wherein the redistributing the requested power headrooms comprises
   selecting one of a plurality of possible allocations based on a set of conditions for water filling, and
   redistributing the requested power headrooms to the plurality of carriers in accordance with the selected allocation.

10. The method of claim 1, wherein the redistributing the requested power headrooms comprises redistributing the requested power headrooms across the plurality of carriers based on greedy filling.

11. The method of claim 1, wherein the redistributing the requested power headrooms comprises
    ordering the plurality of carriers from best to worst based on channel conditions of the plurality of carriers,
    selecting one carrier at a time to allocate power headroom, starting with a best carrier among the multiple carriers,
    allocating a maximum allowed power headroom as a redistributed power headroom for the selected carrier, and repeating the selecting and the allocating until the requested power headrooms are fully used or all subcarriers have been allocated power headrooms.

12. The method of claim 1, wherein the redistributing the requested power headrooms comprises limiting a redistributed power headroom for each carrier to a maximum power headroom for a highest data rate supported by the system.

13. The method of claim 1, wherein the redistributing the requested power headrooms comprises limiting a redistributed power headroom for each carrier to a maximum power headroom determined by available load on the carrier.

14. The method of claim 1, further comprising:
receiving queue information indicative of data to transmit by the UE, and wherein the UE is scheduled for data transmission on the uplink based further on the queue information.

15. The method of claim 1, wherein the scheduling the UE for data transmission comprises
performing scheduling for each of the plurality of carriers separately, and
allocating a granted power headroom to each of at least one carrier based on a redistributed power headroom for the carrier.

16. The method of claim 1, wherein the scheduling the UE for data transmission comprises
sorting a plurality of UEs requesting data transmission on the uplink based on priorities of the UEs, the plurality of UEs including the UE,
selecting one UE at a time for scheduling, starting with a highest priority UE among the plurality of UEs, and
allocating at least one granted power headroom for at least one of the plurality of carriers to the selected UE.

17. The method of claim 1, wherein the redistributing and the scheduling are performed for a plurality of iterations for a plurality of UEs requesting data transmission on the uplink, the plurality of UEs including the UE, and wherein for each iteration the redistributing is performed based on available load for each of the plurality of carriers and the scheduling is performed for a highest priority UE in the iteration.

18. The method of claim 1, wherein the scheduling the UE for data transmission comprises allocating at least one granted power headroom for at least one of the plurality of carriers to the UE based on the redistributed power headrooms for the plurality of carriers, wherein a granted power headroom for a carrier is higher than a requested power headroom for the carrier.

19. An apparatus for scheduling data transmission in a wireless communication system, comprising:
means for receiving requested power headrooms for a plurality of carriers from a user equipment (UE), one requested power headroom for each carrier, each requested power headroom indicative of transmit power usable by the UE for transmission on an associated carrier;
means for redistributing the requested power headrooms across the plurality of carriers to obtain redistributed power headrooms for the plurality of carriers; and
means for scheduling the UE for data transmission on uplink based on the redistributed power headrooms for the plurality of carriers.

20. The apparatus of claim 19, wherein the means for redistributing the requested power headrooms comprises means for redistributing the requested power headrooms to the plurality of carriers based on channel conditions of the plurality of carriers, with carriers having better channel conditions being allocated higher power headrooms.

21. The apparatus of claim 19, wherein the means for redistributing the requested power headrooms comprises means for redistributing the requested power headrooms across the plurality of carriers based on water filling or greedy filling.

22. The apparatus of claim 19, wherein the means for redistributing the requested power headrooms comprises means for limiting a redistributed power headroom for each carrier to a maximum power headroom for a highest data rate supported by the system, or to a maximum power headroom determined by available load on the carrier, or both.

23. An apparatus for scheduling data transmission in a wireless communication system, comprising:
at least one processor configured to receive requested power headrooms for a plurality of carriers from a user equipment (UE), one requested power headroom for each carrier, each requested power headroom indicative of transmit power usable by the UE for transmission on an associated carrier, to redistribute the requested power headrooms across the plurality of carriers to obtain redistributed power headrooms for the plurality of carriers, and to schedule the UE for data transmission on uplink based on the redistributed power headrooms for the plurality of carriers.

24. The apparatus of claim 23, wherein the at least one processor is configured to redistribute the requested power headrooms to the plurality of carriers based on channel conditions of the plurality of carriers, with carriers having better channel conditions being allocated higher power headrooms.

25. The apparatus of claim 23, wherein the at least one processor is configured to redistribute the requested power headrooms across the plurality of carriers based on water filling or greedy filling.

26. The apparatus of claim 23, wherein the at least one processor is configured to limit a redistributed power headroom for each carrier to a maximum power headroom for a highest data rate supported by the system, or to a maximum power headroom determined by available load on the carrier, or both.

27. A computer program product, comprising:
a non-transitory computer-readable medium, comprising:
code for causing at least one computer to receive requested power headrooms for a plurality of carriers from a user equipment (UE), one requested power headroom for each carrier, each requested power headroom indicative of transmit power usable by the UE for transmission on an associated carrier,
code for causing the at least one computer to redistribute the requested power headrooms across the plurality of carriers to obtain redistributed power headrooms for the plurality of carriers, and
code for causing the at least one computer to schedule the UE for data transmission on uplink based on the redistributed power headrooms for the plurality of carriers.

28. A method for wireless communication, comprising:
determining requested power headrooms for a plurality of carriers, based on one requested power headroom for each carrier, each requested power headroom indicative of transmit power usable by a user equipment (UE) for transmission on an associated carrier, comprising:
distributing a maximum transmit power for the UE evenly across the plurality of carries to obtain an allocated transmit power for each of a plurality of carriers, and
determining a requested power headroom each of the plurality of carriers based on the allocated transmit power for the carrier;

determining queue information indicative of data to transmit by the UE, the queue information indicating at least an amount of data to send for the highest priority logical channel associated with the UE; and sending the requested power headrooms for the plurality of carriers and the queue information.

29. The method of claim 28, further comprising:

generating a plurality of resource requests for the plurality of carriers, one resource request for each carrier, the resource request for each carrier including a requested power headroom for the carrier.

30. The method of claim 29, wherein each of the plurality of resource requests includes the queue information.

31. The method of claim 29, wherein only one of the plurality of resource requests includes the queue information.

32. The method of claim 28, further comprising:

receiving at least one resource grant comprising at least one granted power headroom for at least one carrier among the plurality of carriers; and sending data on the at least one carrier in accordance with the at least one granted power headroom.

33. An apparatus for wireless communication, comprising:

means for determining requested power headrooms for a plurality of carriers, based on one requested power headroom for each carrier, each requested power headroom indicative of transmit power usable by a user equipment (UE) for transmission on an associated carrier, comprising:

means for distributing a maximum transmit power for the UE evenly across the plurality of carriers to obtain an allocated transmit power for each of the plurality of carriers, and means for determining a requested power headroom for each of the plurality of carriers based on the allocated transmit power for the carrier;

means for determining queue information indicative of data to transmit by the UE, the queue information indicating at least an amount of data to send for the highest priority logical channel associated with the UE; and means for sending the requested power headrooms for the plurality of carriers and the queue information.

34. The apparatus of claim 33, further comprising:

means for generating a plurality of resource requests for the plurality of carriers, one resource request for each carrier, the resource request for each carrier including a requested power headroom for the carrier.

35. The apparatus of claim 33, further comprising:

means for receiving at least one resource grant comprising at least one granted power headroom for at least one carrier among the plurality of carriers; and means for sending data on the at least one carrier in accordance with the at least one granted power headroom.

36. A method of scheduling data transmission in a wireless communication system, comprising:

determining total available transmit power for data transmission on a plurality of carriers by a user equipment (UE);

distributing the total available transmit power unevenly across the plurality of carriers to obtain an available transmit power for each of the plurality of carriers; and scheduling the UE for data transmission on an uplink based on the available transmit power for each of the plurality of carriers, comprising:

allocating a granted transmit power for each of at least one carrier based on the available transmit power for the carrier, determining a granted power headroom for each of the at least one carrier based on the granted transmit power for the carrier, and sending information indicative of the granted power headroom for each of the at least one carrier to the UE.

37. The method of claim 36, further comprising:

receiving requested power headrooms for the plurality of carriers from the UE, one requested power headroom for each carrier, each requested power headroom indicative of transmit power usable by the UE for transmission on an associated carrier, and wherein the total available transmit power is determined based on the requested power headrooms.

38. The method of claim 36, wherein the distributing the total available transmit power comprises distributing the total available transmit power across the plurality of carriers based on water filling or greedy filling.

39. The method of claim 36, wherein the total available transmit power is distributed across the plurality of carriers based on channel conditions of the plurality of carriers, with carriers having better channel conditions being allocated more transmit power.

40. An apparatus for scheduling data transmission in a wireless communication system, comprising:

means for determining total available transmit power for data transmission on a plurality of carriers by a user equipment (UE);

means for distributing the total available transmit power unevenly across the plurality of carriers to obtain an available transmit power for each of the plurality of carriers; and means for scheduling the UE for data transmission on an uplink based on the available transmit power for each of the plurality of carriers, comprising:

means for allocating a granted transmit power for each of at least one carrier based on the available transmit power for the carrier, means for determining a granted power headroom for each of the at least one carrier based on the granted transmit power for the carrier, and means for sending information indicative of the granted power headroom for each of the at least one carrier to the UE.

41. The apparatus of claim 40, further comprising:

means for receiving requested power headrooms for the plurality of carriers from the UE, one requested power headroom for each carrier, each requested power headroom indicative of transmit power usable by the UE for transmission on an associated carrier, and wherein the total available transmit power is determined based on the requested power headrooms.

42. The apparatus of claim 40, wherein the means for distributing the total available transmit power comprises means for distributing the total available transmit power across the plurality of carriers based on water filling or greedy filling.

43. The apparatus of claim 40, wherein the total available transmit power is distributed across the plurality of carriers based on channel conditions of the plurality of carriers, with carriers having better channel conditions being allocated more transmit power.

* * * * *